United States Patent [19]
Kielb et al.

[11] Patent Number: 5,847,567
[45] Date of Patent: *Dec. 8, 1998

[54] MICROWAVE LEVEL GAUGE WITH REMOTE TRANSDUCER

[75] Inventors: John A. Kielb, Eden Prairie; Randy J. Longsdorf, Chaska; Grant B. Edwards, Blaine; Donald F. Palan, Chaska, all of Minn.

[73] Assignee: Rosemount Inc., Eden Prairie, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 315,429

[22] Filed: Sep. 30, 1994

[51] Int. Cl.$^6$ .............................. G01R 27/04; G01F 23/28
[52] U.S. Cl. ......................... 324/642; 324/644; 73/290 R
[58] Field of Search ................................ 324/637, 642, 324/643, 644; 73/290 R, 290 V, 291; 340/612, 616, 618; 342/124

[56] References Cited

U.S. PATENT DOCUMENTS

| | | | |
|---|---|---|---|
| 3,150,367 | 9/1964 | Harrington | 343/14 |
| 3,184,969 | 5/1965 | Bolton | 73/290 |
| 3,286,098 | 11/1966 | Long et al. | 250/230 |

(List continued on next page.)

FOREIGN PATENT DOCUMENTS

| | | |
|---|---|---|
| 1256301 | 6/1989 | Canada . |
| 0 063 685 A1 | 11/1982 | European Pat. Off. . |
| 0 214 801 A1 | 3/1987 | European Pat. Off. . |
| 42 41 910 A1 | 6/1994 | Germany . |
| 1 315 045 | 4/1973 | United Kingdom . |
| 2290142 | 12/1995 | United Kingdom . |
| WO 90/09599 | 8/1990 | WIPO . |
| WO 91/18266 | 11/1991 | WIPO . |

OTHER PUBLICATIONS

*Krohne America Model BM70 Level–Radar Manual*, "Non-contact level gauging using electromagnetic waves", Aug. 1992, p. 7, 13–15, 24–25.

"Control Devices and Systems," *Control Engineering*, Jul. 1984, p. 68. (Month unavailable).

Brochure "Cap–Level II Series", from Bindicator Company, May 1992 two pages. (Month unavailable).

*Mergers & Acquisitions Report:* Jun. 13, 1994, located in a computer database search.

*News Release:* May 1991, entitled Continuous Radio Frequency Level Sensor for Liquids, located in computer database search. (Month unavailable).

*News Release:* May 1989, entitled Continuous Level Sensor Provides Accuracy, located in computer database search. (Month unavailable).

*News release:* Sep. 9, 1988, entitled Display Converts Analog Signal to Visual Readout, located in computer database search.

(List continued on next page.)

*Primary Examiner*—Diep N. Do
*Attorney, Agent, or Firm*—Westman, Champlin & Kelly, P.A.

[57] ABSTRACT

A level sensor for use in a process application measures height of a product in a tank. The level meter includes a microwave feedhorn directed into the tank, an electronics housing spaced apart from the feedhorn and a microwave waveguide extending therebetween. A microwave transducer in the housing couples to the waveguide and sends and receives microwave signals. A microprocessor in the housing identifies echoes from the microwave signals which are generated and sensed by the microwave transducer. The microprocessor determines height of the product based upon a microwave echo from the product and a microwave echo from the feedhorn. The microprocessor compensates for the effect of propagation delay through the waveguide on height measurements with the feedhorn echo and provides an output related to height of the product in the tank.

22 Claims, 7 Drawing Sheets

U.S. PATENT DOCUMENTS

| | | | |
|---|---|---|---|
| 3,695,107 | 10/1972 | Hertz et al. | 73/290 R |
| 4,095,064 | 6/1978 | Fleckenstein | 200/61.21 |
| 4,135,397 | 1/1979 | Krake | 73/290 R |
| 4,146,869 | 3/1979 | Snyder | 367/99 |
| 4,147,906 | 4/1979 | Levine | 200/61.2 |
| 4,163,917 | 8/1979 | Levine | 310/327 |
| 4,183,007 | 1/1980 | Baird | 367/119 |
| 4,221,004 | 9/1980 | Combs et al. | 367/114 |
| 4,255,859 | 3/1981 | Klieman | 33/715 |
| 4,291,309 | 9/1981 | Spiller et al. | 342/82 |
| 4,359,902 | 11/1982 | Lawless | 73/290 R |
| 4,392,032 | 7/1983 | Roach, II | 200/61.21 |
| 4,425,793 | 1/1984 | Turton et al. | 73/290 R |
| 4,458,530 | 7/1984 | Bastida | 73/290 R |
| 4,468,638 | 8/1984 | Kyriakos | 331/178 |
| 4,555,941 | 12/1985 | Fathauer et al. | 73/304 C |
| 4,566,321 | 1/1986 | Zacchio | 73/290 R |
| 4,624,139 | 11/1986 | Collins | 73/304 C |
| 4,676,099 | 6/1987 | McGookin | 73/290 B |
| 4,676,100 | 6/1987 | Eichberger | 73/304 C |
| 4,695,685 | 9/1987 | Fleckenstein et al. | 200/61.21 |
| 4,800,755 | 1/1989 | Fathauer et al. | 73/304 C |
| 4,910,878 | 3/1990 | Fleckenstein et al. | 33/719 |
| 4,945,360 | 7/1990 | Trummer et al. | 342/122 |
| 5,048,335 | 9/1991 | Marsh et al. | 73/304 C |
| 5,088,325 | 2/1992 | Eichberger et al. | 73/304 C |
| 5,105,662 | 4/1992 | Marsh et al. | 73/299 |
| 5,115,218 | 5/1992 | Jean | 333/252 |
| 5,119,676 | 6/1992 | Bower et al. | 73/290 V |
| 5,150,334 | 9/1992 | Crosby | 367/98 |
| 5,161,411 | 11/1992 | Cruickshank | 73/293 |
| 5,164,555 | 11/1992 | Brenton | 200/61.21 |
| 5,164,606 | 11/1992 | Secord | 250/577 |
| 5,166,678 | 11/1992 | Warrior | 340/870.15 |
| 5,223,819 | 6/1993 | Marsh et al. | 340/617 |
| 5,245,873 | 9/1993 | Fathauer et al. | 73/304 C |
| 5,305,237 | 4/1994 | Dalrymple et al. | 364/562 |
| 5,365,178 | 11/1994 | Van Der Pol | 324/644 |
| 5,440,310 | 8/1995 | Schreiner | 342/124 |
| 5,457,990 | 10/1995 | Oswald et al. | 324/642 X |

OTHER PUBLICATIONS

*News Release:* Jul. 7, 1988, entitled Remote Level Sensor Offers Easy Calibration, located in computer database search.

*News Release:* Apr. 1988, entitled Radio Frequency Level Control with F.E.A.T., located in computer database search. (Month unavailable).

*News Release:* Oct. 30, 1987, located in computer database search.

*New Product Announcement:* Jun. 1987, No. 01654416, located in computer database search.

*New Product Announcement:* Jun. 8, 1987, No. 0164492, located in computer database search.

*New Product Announcement:* Jun. 1987, No. 0163995, located in computer database search.

*New Product Announcement:* Jun. 10, 1987, No. 0156975, located in computer database search.

*New Product Announcement:* Jan. 1987, No. 0153579, located in computer database search. (Month unavailable).

*New Product Announcement:* Feb. 1987, No. 0152828, located in computer database search. (Month unavailable).

*New Product Announcement:* Dec. 22, 1986, No. 0148685, located in computer database search. (Month unavailable).

*New Product Announcement:* Jul. 1986, No. 0135139, located in computer database search. (Month unavailable).

*New Product Announcement:* Aug. 1985, entitled A Yo–Yo That Offers Safe and Reliable Level Control, located in computer database search. (Month unavailable).

*News Bulletin:* Sep. 1985, No. 0116075, located in computer database search. (Month unavailable).

*New Product Announcement:* Jun. 1985, No. 101134, located in computer database search. (Month unavailable).

*New Product Announcement:* Jun. 1985, No. 101132, located in computer database search. (Month unavailable).

Advertisement, "Wave Radar," *Level Transmitters*, pp. 14 and 15, (Undated).

TN CannonBear®, Product Specifications, "Cannonbear® 1001 Microwave Level Transmitter", Form 3A:01C, Aug. 1989.

Fig. 1

PRIOR ART

MICROWAVE LEVEL GAUGE WITH REMOTE TRANSDUCER

BACKGROUND OF THE INVENTION

The present invention relates to industrial processes. More specifically, the present invention relates to measurement of product level height in a storage tank of the type used in industrial applications.

Instrumentation for the measurement of product level (either liquids or solids) in storage vessels is evolving from contact measurement techniques, such as tape and float, to non-contact techniques. One technology that holds considerable promise is based on the use of microwaves. The basic premise involves transmitting microwaves towards the product surface and receiving reflected microwave energy from the surface. The reflected microwaves are analyzed to determine the distance that they have traveled. Knowledge of the distance traveled and storage vessel height allows determination of product level. Since it is known that microwaves travel at the speed of light, the distance that a microwave travels can be determined if the time of travel is known. The time of travel can be determined by measuring the phase of the return wave and knowing the frequency of the microwave that was transmitted. Further, the time of travel can be measured using well-known digital sampling techniques.

Figure 1:
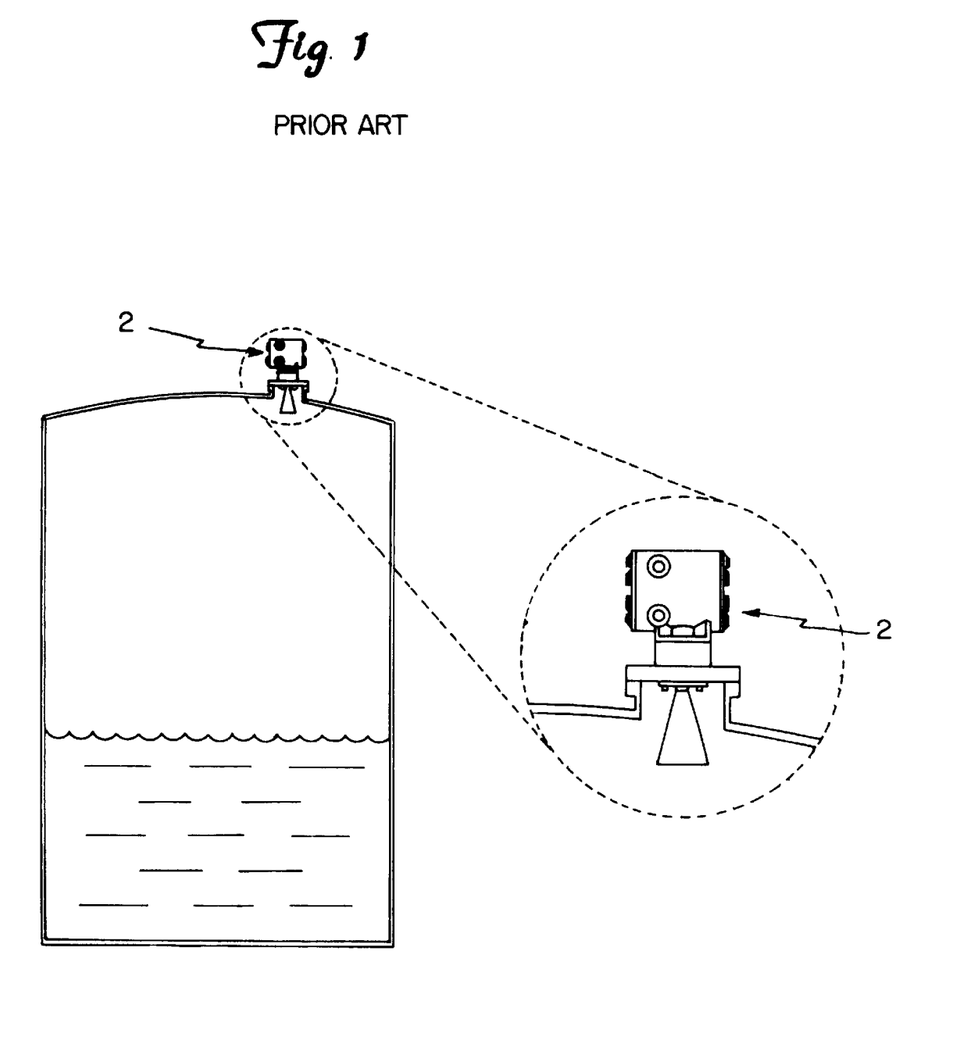
FIG. 1 is a diagram of a prior art top mount microwave level gauge.

Non-contact level measuring instruments, such as a microwave level gauge, are typically mounted on top of the storage vessel (tank). This can cause considerable inconvenience and/or expense for the end user. For example, installation, configuration changes, maintenance and repair operations all require climbing to the top of the tank while carrying the instrument, tools, wire, etc. Similarly, if the instrument contains a meter or display showing data, configuration or diagnostics, additional trips to the top of the tank will be required each time a reading is desired. Not only is this hard physical work, there is also the potential for accident or injury to those involved. FIG. 1 illustrates a typical top mounted level gauge 2 based on microwave technology. These arrangements are cumbersome, require placement of the electronics in a harsh environment and are difficult to repair due to their remote location.

SUMMARY OF THE INVENTION

A level sensor measures height of product in a tank such as those used in industrial process applications. The level meter includes a microwave feedhorn directed into the tank, an electronics housing spaced apart from the feedhorn and a microwave waveguide coupled to the housing and the feedhorn for carrying microwave radiation therebetween. A microwave transducer in the housing couples to the waveguide, and sends and receives microwave signals. A microprocessor in the housing identifies echoes, through the location of spurious pulses in either the frequency or time domains, from microwave signals generated and sensed by the microwave transducer. The microprocessor outputs height of the product based upon a microwave echo from the product and a microwave echo from the feedhorn. The microprocessor compensates the effect of propagation delay through the waveguide on height measurements by using the feedhorn echo as a reference signal related to the top of the storage tank.

DETAILED DESCRIPTION OF THE PREFERRED EMBODIMENTS

Figure 2:
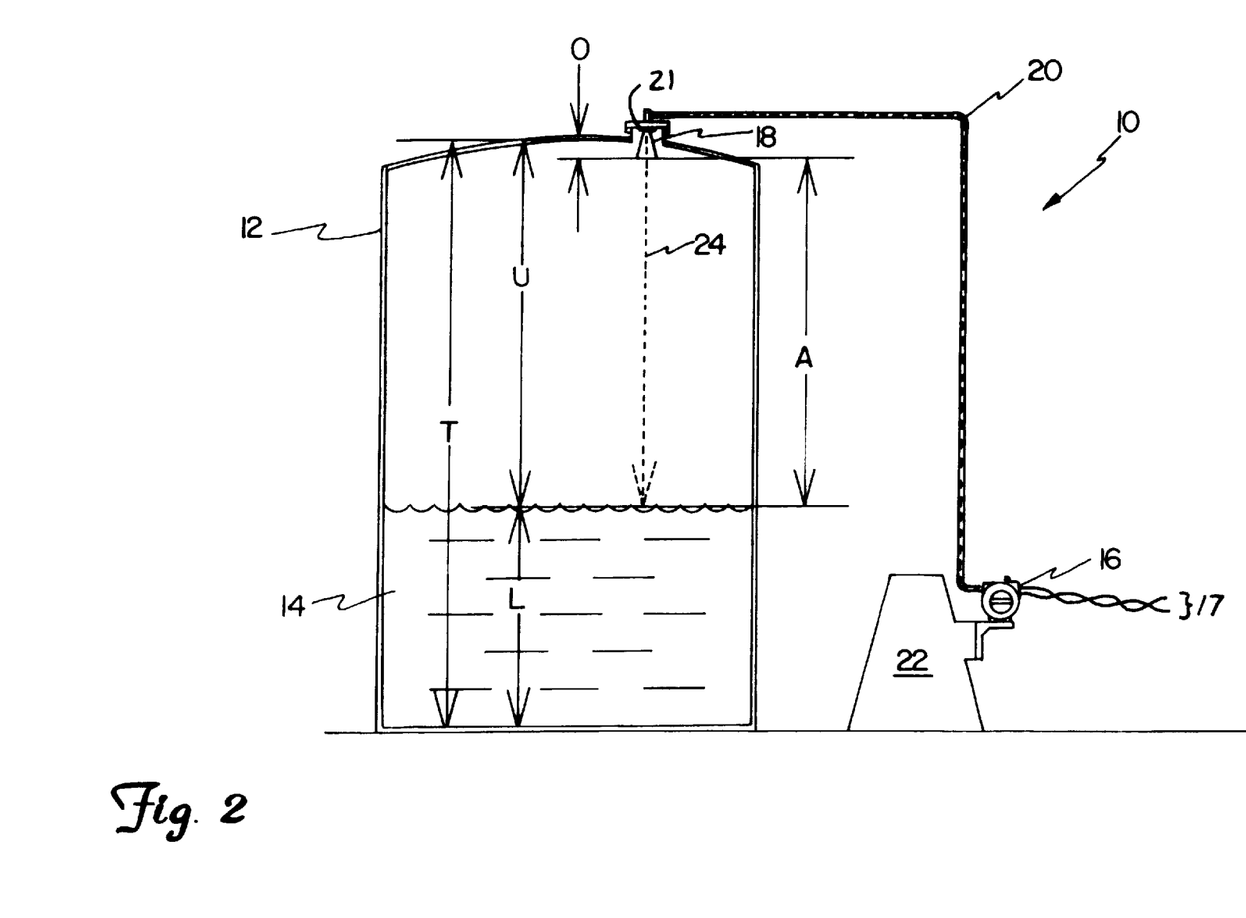
FIG. 2 is a diagram which shows a microwave level gauge.

FIG. 2 is a diagram which shows microwave level gauge 10 operably coupled to storage tank 12. Storage tank 12 is the type typically used in process applications and contains fluid (product) 14. As used herein, product 14 can be a liquid, a solid or a combination of both. Level gauge 10 includes housing 16 which couples to microwave feedhorn 18 through microwave waveguide 20. Housing 16 is mounted on a pedestal 22. If it is desirable to locate housing 16 away from tank 12, then pedestal 22 is a cement curb or barrier which would physically separate the housing from the tank area. Waveguide 20 introduces a delay in the path of the microwave signal. This delay can change based upon the installation. Additionally, temperature variation can dynamically change the length of waveguide 20 during operation and lead to inaccurate readings. Housing 16 is spaced apart from a harsh environment proximate tank 12. The advantages of this configuration include easy access to data, such as process variables, configurations, or diagnostics, and availability of wiring terminals and circuitry without climbing to the top of the tank. Also, this configuration does not require any wiring or transmission of dc power to the top of the tank. Also, diagnostic work, troubleshooting, recalibration, reconfiguration, repair or maintenance may be performed on the unit away from tank 12.

A potential problem with a microwave level gauge 10 constructed using this split architecture approach is that temperature changes may cause expansion or contraction in the length of waveguide 20 causing errors in the distance measurement. Reference tables indicate that $20.7 \times 10^{-6}$ m/m°C. is a typical coefficient of thermal expansion for aluminum. Depending on the temperature excursions at the specific installation, this can become a significant error.

Assume: 20 meters of aluminum waveguide
    80° C. temperature excursion (−40° C. to 40° C.) [−40° F. to 104° F.]
    $20.7 \times 10^{-6}$ m/m°C. waveguide coefficient of thermal expansion
    20 m $\times 20.7 \times 10^{-6}$ m/m°C. $\times 80°$ C. $= 0.03312$ m $= 33.12$ mm The calculation above illustrates the total change in waveguide length as might be experienced from season to season. A more realistic daily calculation based on a 10° C. temperature changes follows below:

$$20 \text{ m} \times 20.7 \times 10^{-6} \text{ m/m°C.} \times 10° \text{ C.} = 0.00414 \text{ m} = 4.14 \text{ mm}$$

Assuming a microwave level gauge accuracy specification of 1 mm, the daily calculation indicates that the waveguide length change is 4.1 times larger than the desired accuracy. It logically follows, then, that either the product specification must be derated for temperature or that waveguide length temperature compensation must be performed. This document discloses methods for automatically determining the error and correcting the measured distance accordingly.

One way to compensate for this error is to calculate the waveguide length change based on knowledge of the material of construction and current temperature. This requires that the unit contain a temperature sensor and that a reference condition be known. The most likely way to establish a reference condition is during the installation of the level gauge on the tank. The customer would input the present level into the microwave level gauge based on a hand dip or some other reference measurement. Since the level and present temperature are known, a baseline condition or "reference waveguide length" can be established.

FIG. 2 illustrates a number of critical dimensions. L is the height of product 14 in tank 12, T is the total height of tank 12 and U is the ullage which is the difference between the total height T and the product height L. O is the offset of antenna 18 as measured from the end of antenna 18 to the top of tank 12.

Circuitry in housing 16 measures distance A, the distance between the end of feedhorn 18 and product 14. Microwaves 24 are generated in housing 16 and follow waveguide 20 to feedhorn 18, and are transmitted to the product 14. Waveguide 20 is a standard rectangular waveguide made of, for example, silver, aluminum or brass. These microwaves are reflected by product 14 back toward feedhorn 18 into waveguide 20 to housing 16. Circuitry in housing 16 calculates distance A by measuring the distance which microwaves 24 travel and subtracting out the distance from housing 16 to the end of feedhorn 18 through waveguide 20. This is done using the microwave reflection generated at the end of feedhorn 18. By dynamically compensating for errors arising from variations in the length of waveguide 20 due to temperature changes or other factors contributing to length variations, level gauge 10 maintains high accuracy even under extreme environmental variations.

Figure 3:
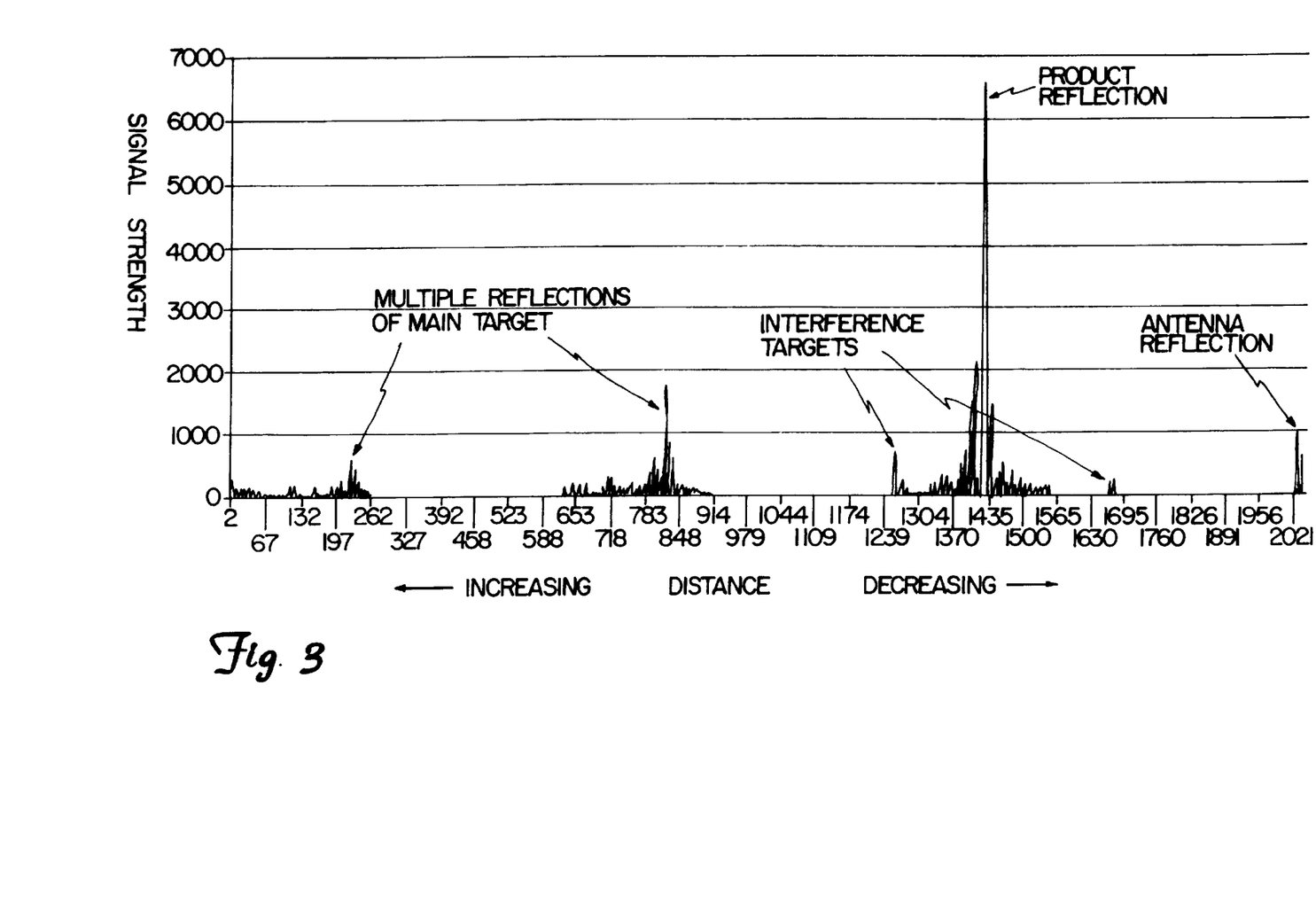
FIG. 3 is a graph of distance versus signal strength.

A known microwave distance measurement technique is FMCW (Frequency Modulated Continuous Wave) radar, such as that described in U.S. Pat. No. 4,945,360, entitled "Radar Altimeter." One of the advantages of using this technique, which involves Fourier analysis, is that any target within the microwave beam shows up in the output spectrum. This includes the end of the antenna that is transmitting the microwave beam. FIG. 3 shows the actual output spectrum for a microwave level gauge that uses an FMCW/Fourier measurement technique.

FIG. 3 is a graph of reflected signal strength versus distance. The largest peak in FIG. 3 is due to the reflection off the surface of product 14. The reflection due to antenna feedhorn 18 is at the far right side of the graph. FIG. 3 also shows reflections due to interference and harmonics. The location of the product reflection and the antenna reflection change as the length of waveguide 20 changes, however the relative distance between the two stays constant. This is particularly significant where accurate measurement of level is important because temperature changes can cause the length of waveguide 20 to change. Measurement of liquid level is not affected by changes in the length of waveguide 20 because level gauge 10 is able to compensate for the length of waveguide 20.

The FMCW/Fourier spectrum of FIG. 3 clearly defines the end of the antenna signal. This point can be used as a "pseudo zero" thus negating the effect of waveguide length changes due to temperature. In other words, the distance being measured is referenced to the end of the antenna 18 signal rather than to the detector inside the microwave level gauge housing 16. The level can be expressed as:

Level (L)=Tank Height (T) −Antenna Offset (O)−Antenna to Surface Distance (A)    Equation 1

The antenna offset constant (O) is determined when level gauge 10 is installed on the tank based on the current level (L) (hand dip or other reference measurement) as entered by the customer. Since level (L) and tank height (T) are known and the antenna to surface distance (A) is being measured, the antenna offset constant (O) can be calculated using Equation 1 and stored in memory (32 in FIG. 4).

Another method of temperature compensation of waveguide length involves designing an impedance 21 into the waveguide 20 where it meets the antenna 18. This will cause a microwave reflection to occur that will be contained in the FMCW/Fourier spectrum. The waveguide length and corresponding changes in length can now be directly measured and accounted for. The level (L) is as follows:

Level (L)=Tank Height (T)−Total Microwave Distance−Waveguide Length    Equation 2

Each of the techniques discussed in this application allows full compensation of waveguide length changes due to temperature and a combination of these methods also allows use of other features and diagnostics based on the end of the antenna signal.

The X axis of FIG. 3 is shown in distance. It is calculated from frequency for an FMCW (Frequency Modulated Continuous Wave) radar system, and from time in a "time-of-flight" system.

Figure 4:
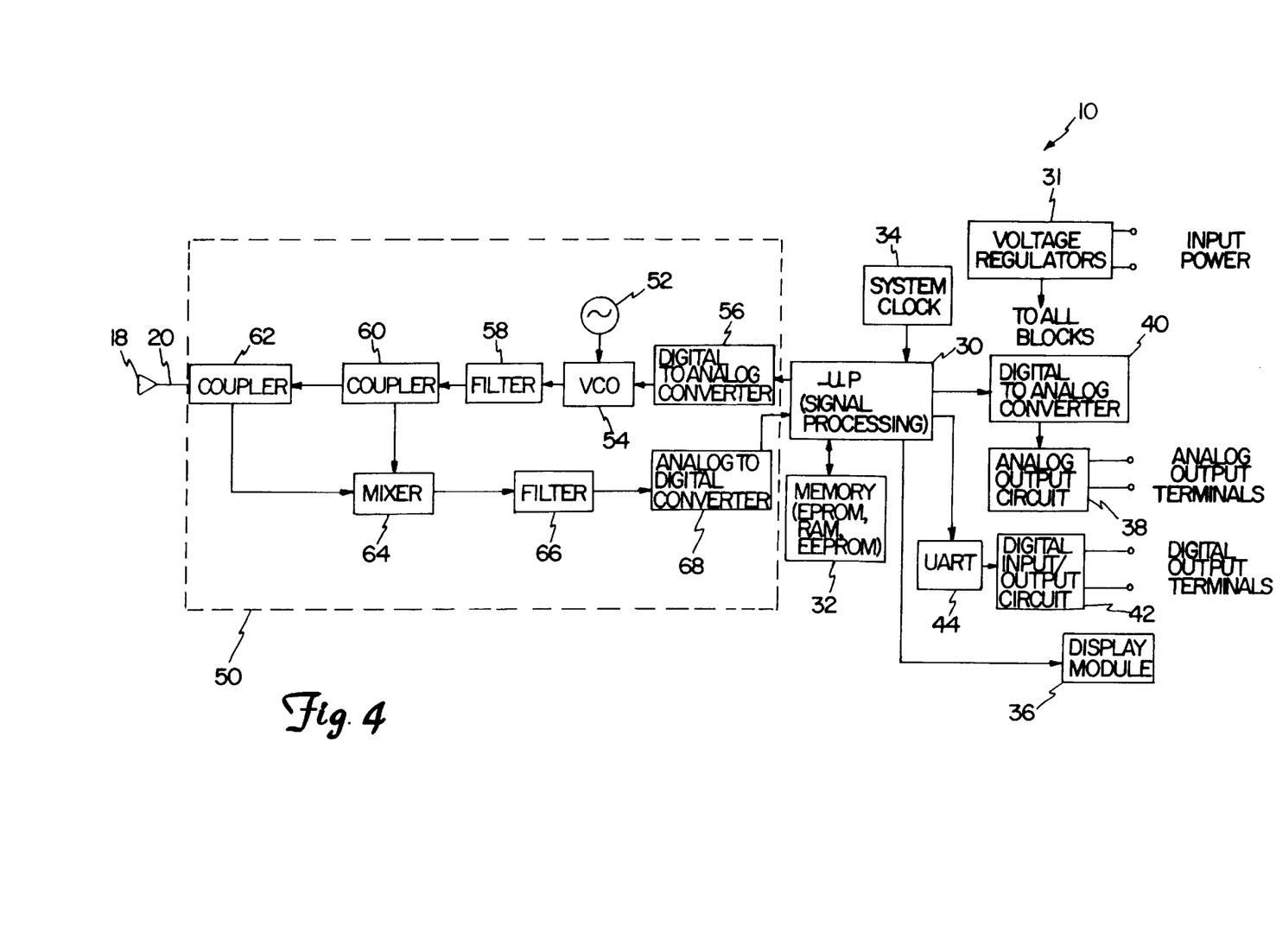
FIG. 4 is a block diagram of an FMCW microwave level sensor.

FIG. 4 is a block diagram of an FMCW microwave level gauge 10. Level gauge 10 includes a microprocessor 30 which operates according to instructions and information stored in memory 32 at a system clock rate set by clock 34. Voltage regulators 31 receive a power input and provide a regulated voltage output to the circuitry of level gauge 10.

Microprocessor 30 is coupled to antenna 18 for measurement of level L of product 14 using microwave circuitry 50. A microwave source 52 provides microwave radiation to a voltage controlled oscillator (VCO) 54. Typically, the frequency of microwave source 52 is between about 5.8 GHz and 30 GHz, and is preferably about 24 GHz. The output of VCO 54 is provided to waveguide 20 after passing through a filter 58 and microwave couplers 60 and 62. Microwave signals reflected off the product surface are received through mixer 64 which is a standard superheterodyne mixer which mixes an incoming microwave signal with the output of coupler 60, and provides a base band output to filter 66 which is digitized and provided to microprocessor 30 by analog-to-digital converter 68. In one embodiment, filter 58 is a band pass and filter 66 is a low pass filter. Level sensor 10 is a frequency modulated continuous wave (FMCW) microwave level gauge. As is well known in the art, in FMCW, the carrier frequency of the microwave signal is modulated. In the instant case, this is under control of microprocessor 30. Reflected signals have a phase change in the frequency domain which is detected by microprocessor 30 after the received signal is down converted with mixer 64 and digitized by A/D converter 68. A Fourier analysis of the output of mixer 64 is shown in FIG. 3. Microprocessor 30 identifies the peak due to product 14 and the peak due to antenna 18, and calculates A and L using Equations 1 and 2. Liquid level L is displayed on display 36 and provided in an analog format at the analog output of circuit 38 driven with A/D converter 40, and in a digital format at the digital output of circuit 42 driven with UART 44.

Figure 5:
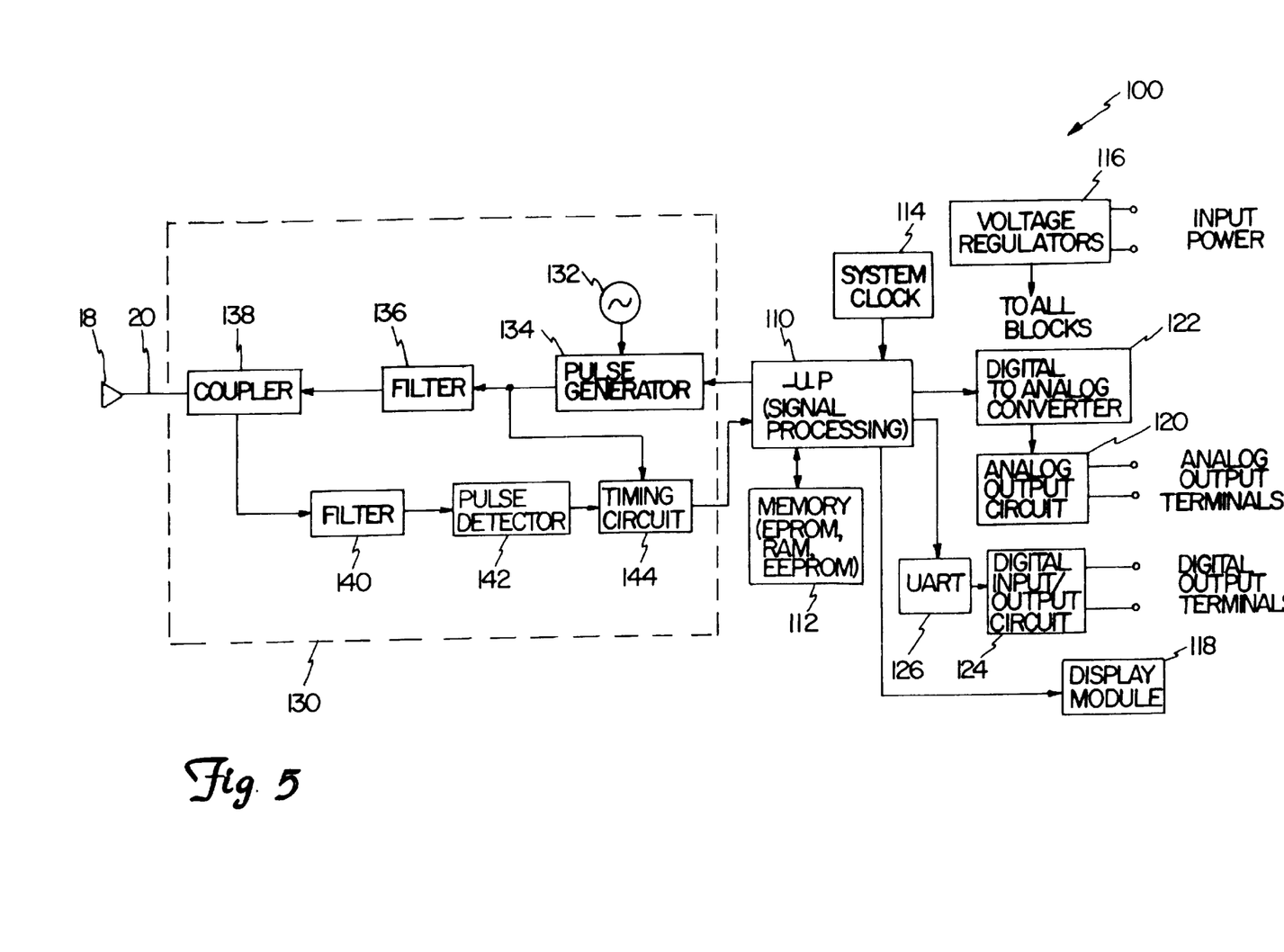
FIG. 5 is a block diagram of a time-of-flight microwave level sensor.

FIG. 5 is block diagram of level gauge 100 which operates according to microwave time-of-flight principles in which the time delay of microwave pulses are measured to calculate distances, but provides outputs similar to those described for level gauge 10. Level gauge 100 includes microprocessor 110 which operates according to instructions and information stored in memory 112 at a clock rate set by system clock 114. Circuitry in level gauge 100 is powered by voltage regulators 116 which receive a power input off a loop (not shown) and provide a regulated voltage output to the circuitry in gauge 100. Microprocessor 110 displays information on display 118, provides an analog output from circuitry 120 through digital-to-analog converter 122, and provides a digital output from circuitry 124 through UART 126.

Microprocessor 110 is coupled to antenna 18 through waveguide 20 and microwave circuitry 130. Microwave source 132 generates a pulsed microwave signal which is controlled by microprocessor 110 using pulse generator 134. The microwave pulses are provided to antenna 18 and waveguide 20 through filter 136 and microwave coupler 138. Microwave signals which are received from antenna 18 and waveguide 20 are provided to filter 140 and pulse detect circuit 142. Timing circuit 144 may provide the microprocessor with counts proportional to time-of-flight or it may be a digital sampling circuit which "down converts" the echoes to a lower frequency to make it more practical to determine the time difference between the transmitted pulse and the echo return. Those skilled in the art will realize that other methods may be used to determine the time-of-flight. Timing circuitry 144 provides digital logic levels to microprocessor 110. Microprocessor 110 identifies the initial pulse and determines the time delay of the reflected pulse which corresponds to the end of feedhorn 18, interference targets and the level of product 14.

In one embodiment, microwave source 132 has a frequency range of between about 2.7 GHz and 30 GHz, and is preferably about 24 GHz. Filter 136 has a band pass characteristic and filter 140 has a band pass characteristic. The time between pulses is between about 0.25 $\mu$s and about 1.0 $\mu$s, and is preferably about 0.5 $\mu$s.

In one embodiment, level gauges 10 and 100 are adapted for coupling to a two-wire process control loop, such as a 4–20 mA current loop 17 shown in FIG. 2. In such an embodiment, analog circuits 38 and 120 and digital circuits 42 and 124 couple to the loop. The analog circuit can be used to control the current level through the loop to represent the level of product 14. Additionally, digital information can be transmitted over the control loop (optionally superimposed on the analog current) using the digital circuitry. In one embodiment, level gauges 10 and 100 are powered using power received from the control loop. In this configuration, voltage regulators 31 and 116 are coupled to the control loop.

Figure 6:
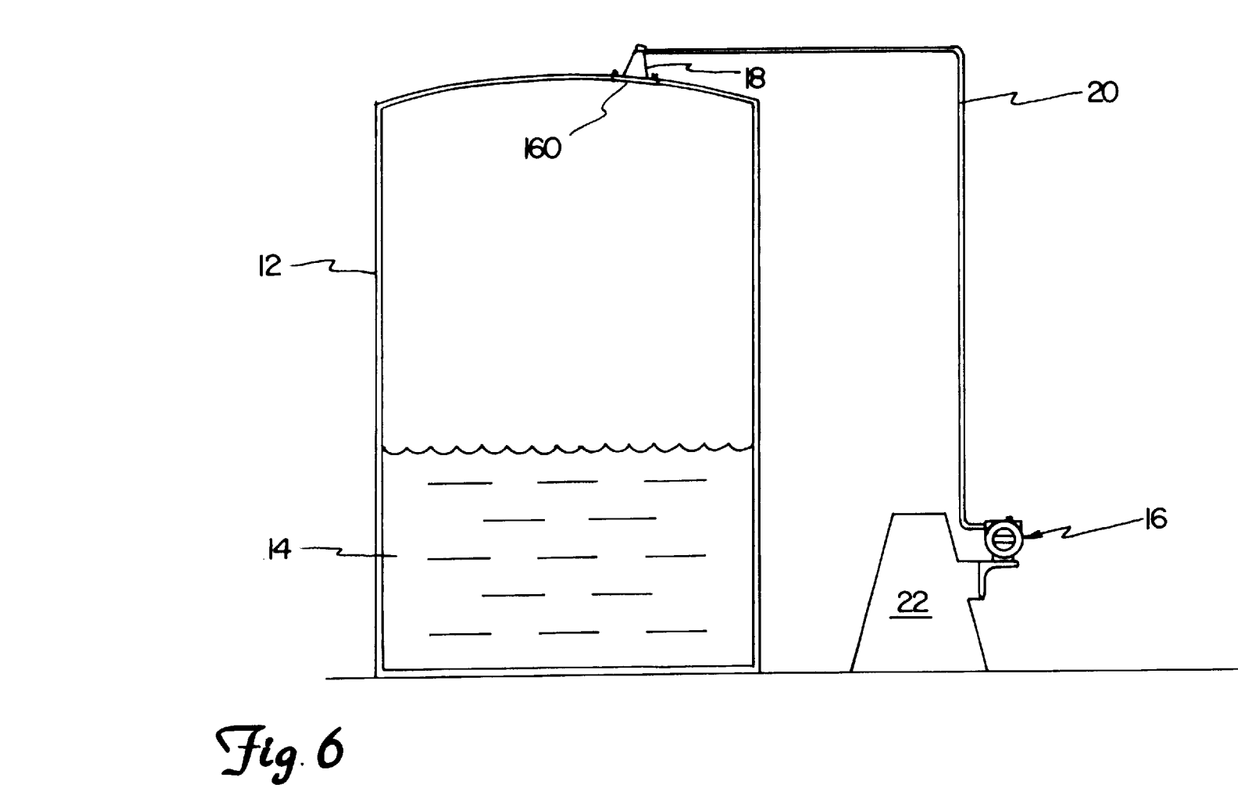
FIG. 6 is a diagram of a microwave level gauge in accordance with another embodiment.

FIG. 6 shows another embodiment in which feedhorn 18 is not placed within tank 12. Instead, a microwave window 160 is provided in the top of tank 12 and feedhorn 18 is directed into tank 12 through microwave window 160. This allows tank 12 to remain sealed during measurement of level of product 14 and avoids costly intrusions into tank 12. In one embodiment, window 160 comprises PTFE.

Figure 7:
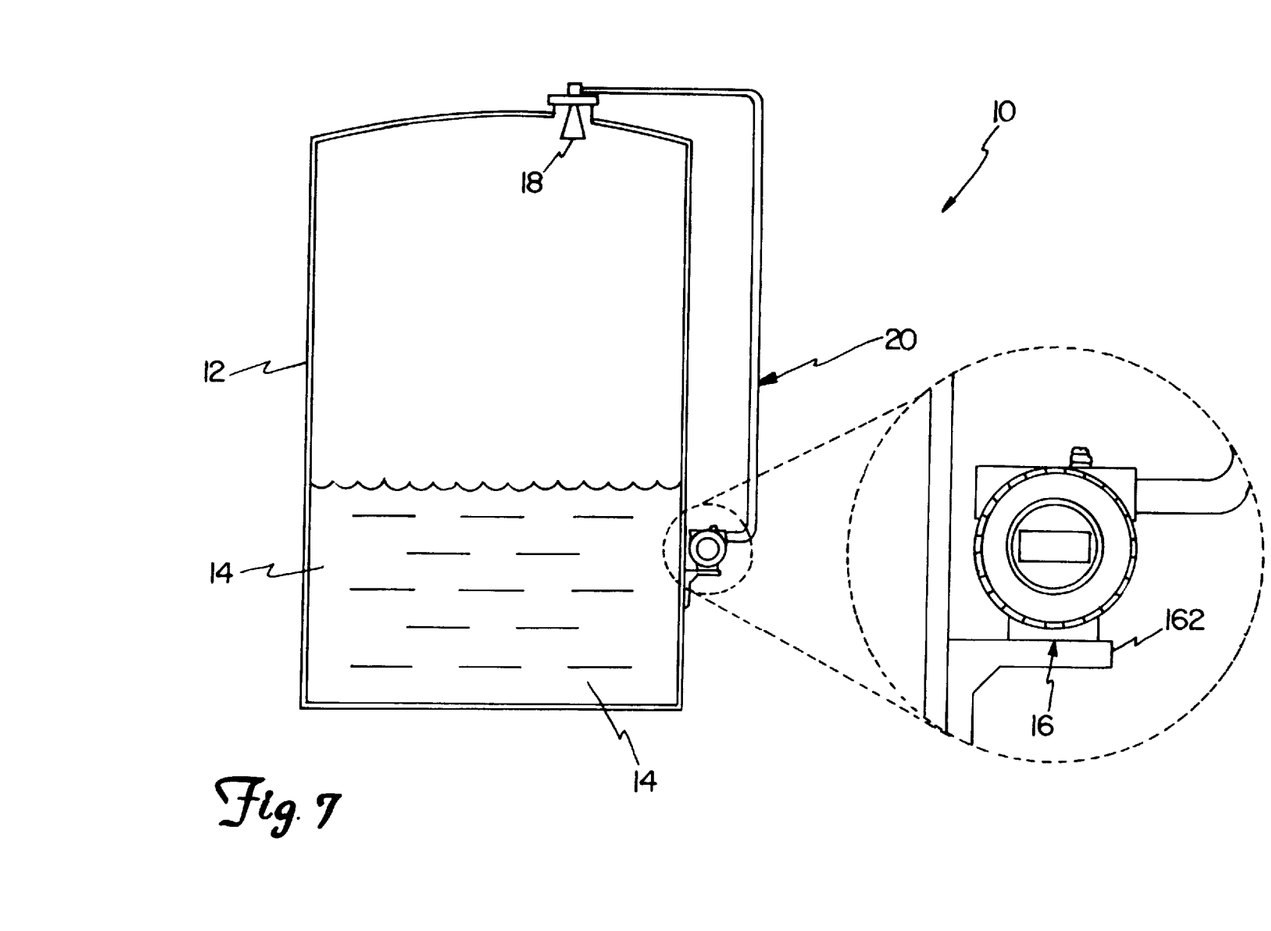
FIG. 7 is a diagram of a microwave level gauge in accordance with another embodiment.

FIG. 7 shows another embodiment in which microwave level gauge 10 is mounted proximate to the side of tank 12 on mounting bracket 162.

Although the present invention has been described with reference to preferred embodiments, workers skilled in the art will recognize that changes may be made in form and detail without departing from the spirit and scope of the invention. For example, other types of antennas such as a parabolic antenna, a patch or circuit board antenna could be used. Additionally, the echo at the end of the wave guide can be generated using an impedance element. Further, coax or other appropriate cabling can be used as a substitute for the waveguide.

What is claimed is:

1. A level meter for measuring height of a product in a tank in a process application, comprising;

a microwave antenna directed into the tank;

an electronics housing spaced apart from the antenna and mounted proximate the side of the tank;

a waveguide having a length which varies as a function of temperature and which is coupled to the antenna and the housing for conducting microwave radiation between the antenna and the housing;

a microwave transducer in the housing coupled to the waveguide which sends and receives microwave signals;

output circuitry in the housing; and measurement circuitry which compares a microwave reflection from the product with a microwave responsively calculates product level height which is provided to the output circuitry, wherein the measurement circuitry uses the microwave reflection from the product to calculate a first distance travelled by microwaves reflected from the product and uses the microwave reflection generated proximate the antenna to disregard a second distance travelled by microwaves reflected proximate the antenna.

2. The level meter of claim 1 wherein the tank includes a microwave transparent aperture and the antenna is mounted proximate the aperture.

3. The level meter of claim 1 wherein the electronics housing is mounted in a position spaced apart from the tank.

4. The level meter of claim 1 including a power distribution circuit for coupling to a two-wire process control loop to power the level meter.

5. The level meter of claim 1 wherein the output circuitry comprises I/O circuitry for coupling to a process control loop and transmitting product level information over the loop.

6. The level meter of claim 1 wherein the output circuitry comprises a display for display of level information to an operator.

7. The level meter of claim 1 including microwave circuitry which modulates the frequency of the microwave signal and which provides an output to the measurement circuitry based upon phase of received microwave signals relative to sent microwave signals.

8. The level meter of claim 1 including microwave circuitry which pulses the microwave signal and provides an output to the measurement circuitry related to receipt of a microwave pulse.

9. The level meter of claim 1 including an impedance element proximate the feed horn which generates the microwave reflection.

10. The level meter of claim 1 wherein the microwave reflection generated proximate the antenna is generated by the antenna.

11. The level meter of claim 1 wherein the frequency of the microwave signal is between about 2.7 GHz and about 30 GHz.

12. A microwave level meter for measuring height of a product in a tank in a process application, comprising:

a microwave antenna directed into the tank toward the product;

an electronics housing spaced apart from the antenna at a position proximate a side of the tank;

a microwave waveguide coupled to the electronics housing and antenna and having a length which changes based upon temperature;

microwave transducing circuitry coupled to the waveguide for sending and receiving microwave signals; and measurement circuitry which measures height of the product and provides an output based upon a microwave echo from the product and a microwave echo generated proximate the antenna, wherein the output provided by the measurement circuitry is indicative of a difference between a first distance travelled by microwaves reflected from the product and thereby causing the microwave echo from the product and a second distance travelled by microwaves reflected proximate the antenna and thereby causing the microwave echo generated proximate the antenna such that the output provided by the measurement circuitry disregards length variations in the waveguide.

13. The microwave level meter of claim 12 wherein the microwave signal is frequency modulated and the measurement circuitry is responsive to phase of an echo signal.

14. The microwave level meter of claim 12 wherein the microwave signal is pulse modulated and the measurement circuitry is responsive to time delay of an echo signal.

15. The microwave level meter of claim 12 wherein the measurement circuitry is mounted on a pedestal.

16. The microwave level meter of claim 12 wherein the measurement circuitry is mounted on a side of the tank.

17. The microwave level meter of claim 12 including a display coupled to the measurement circuitry which displays the output.

18. The microwave level meter of claim 12 including output circuitry for coupling the measurement circuitry output to a two-wire process control loop.

19. The microwave level meter of claim 12 including a power supply for coupling to a two-wire process control loop and providing power to the level meter.

20. The microwave level meter of claim 12 including an impedance element proximate the antenna which generates a microwave echo.

21. The microwave level meter of claim 12 wherein the antenna generates a microwave echo.

22. The microwave level meter of claim 12 wherein the frequency of the microwave signal is between about 2.7 GHz and about 30 GHz.

\* \* \* \* \*

UNITED STATES PATENT AND TRADEMARK OFFICE
CERTIFICATE OF CORRECTION

PATENT NO.    : 5,847,567
DATED         : December 8, 1998
INVENTOR(S)   : Kielb et al.

It is certified that error appears in the above-identified patent and that said Letters Patent is hereby corrected as shown below:

<u>Title page,</u>
Item [75], Inventors, should read:
-- [75] Inventors:   John A. Kielb, Eden Prairie; Randy J. Longsdorf, Chaska; Grant B. Edwards, Blaine; Donald F. Palan, Chaska; Scott D. Manicor, Eden Prairie, all of Minn. --.

Signed and Sealed this

Sixth Day of September, 2005

JON W. DUDAS
*Director of the United States Patent and Trademark Office*